June 17, 1930.  F. C. LEONARD  1,764,271
METHOD OF PRODUCING A COMPOSITE METAL
Filed Dec. 8, 1925  2 Sheets-Sheet 1
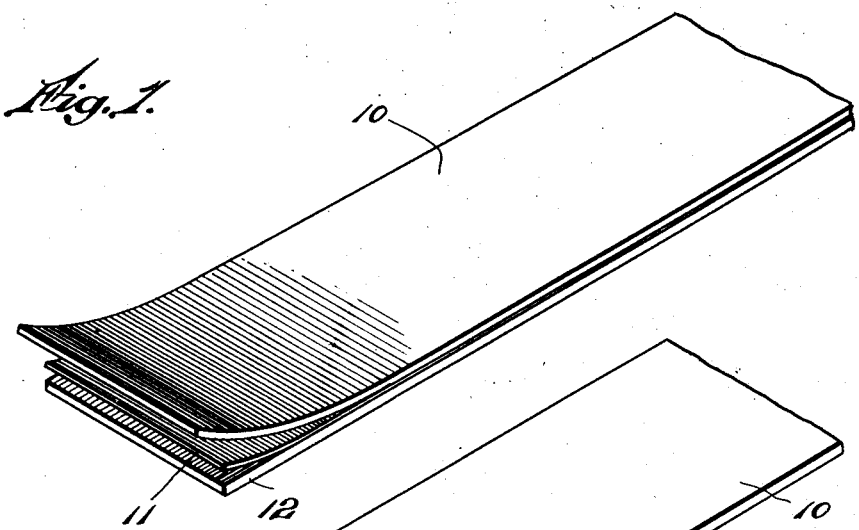
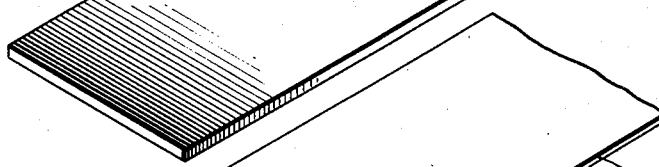
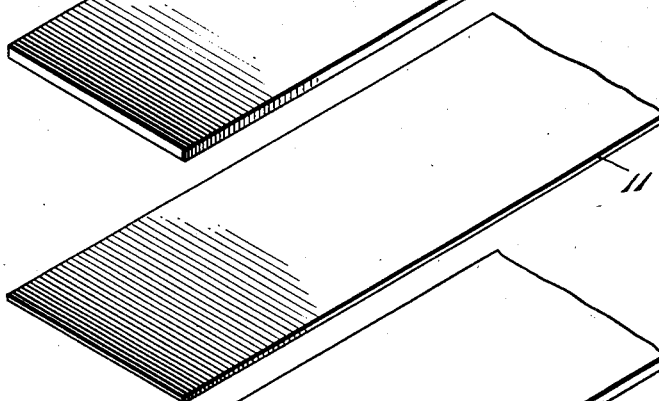
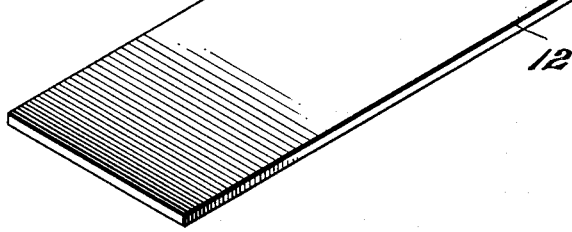
INVENTOR.
Frederick C. Leonard.
BY Barlow & Barlow
ATTORNEYS.

June 17, 1930.  F. C. LEONARD  1,764,271
METHOD OF PRODUCING A COMPOSITE METAL
Filed Dec. 8, 1925    2 Sheets-Sheet 2
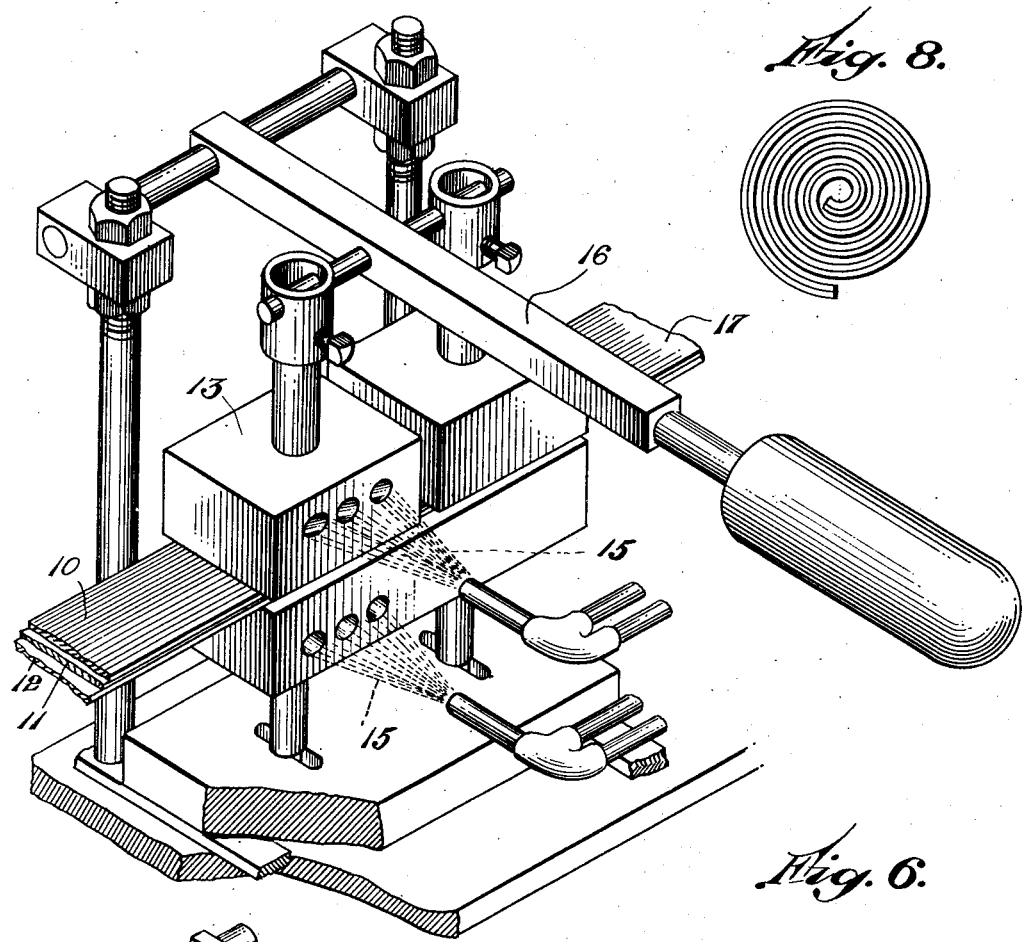
Fig. 8.
Fig. 6.
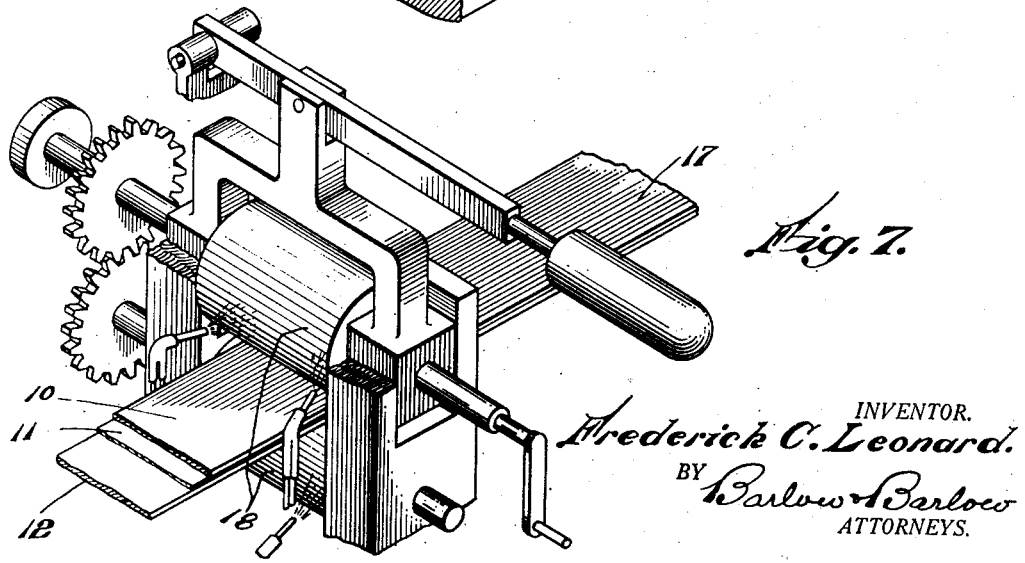
Fig. 7.
INVENTOR.
Frederick C. Leonard.
BY Barlow & Barlow
ATTORNEYS.

Patented June 17, 1930

1,764,271

UNITED STATES PATENT OFFICE

FREDERICK C. LEONARD, OF PROVIDENCE, RHODE ISLAND, ASSIGNOR TO LEONARD-ROOKE CO., OF PROVIDENCE, RHODE ISLAND, A CORPORATION OF RHODE ISLAND

METHOD OF PRODUCING A COMPOSITE METAL

Application filed December 8, 1925. Serial No. 74,144.

This invention relates to an improved art or method of producing a composite metal used primarily for thermostatic purposes, and has for its object to produce such a composite metal by first properly preparing and then uniting two different metals having widely different co-efficients of expansion, so securely that they will not separate under the relative expansion and contraction when acted upon by widely varying temperatures, the parts being so joined that they will not separate during a subsequent rolling operation necessary for reducing the metal to a finished or operating size after having been united.

A further object of this invention consists in first subjecting the different plates of metal each to a rolling operation to reduce them to approximately their finished thickness before uniting them, so that a subsequent further reduction in thickness is unnecessary; then to assemble these plates so treated in adjacency with a thin strip of fusible or soldering metal between them and subjecting the whole to a heat sufficient to fuse the solder to unite the other two strips together.

A still further object of this invention is to unite the expanding and relatively non-expanding strips or plates by progressively subjecting portions or sections of the same to a heat sufficient to fuse a soldering plate between them in order that the different co-efficients of expansion of the different metals may be taken up or compensated for by being allowed to receive a relative endways expanding movement and so adjust themselves during the heating and uniting operations.

With these and other objects in view, the invention consists of certain novel features of construction, as will be more fully described, and particularly pointed out in the appended claims.

In the accompanying drawings:

Figure 1 is a perspective view showing a strip of expandible metal positioned upon a strip of relatively non-expandible metal with a thin leaf of fusible metal between them.

Figure 2 is a perspective view showing a short length of the expandible metal.

Figure 3 is a short length of the fusible metal.

Figure 4 shows a short length of the non-expandible metal.

Figure 5 is a sectional end view showing the expandible and relatively non-expandible metals as united together by the fusible metal after having been subjected to heat and pressure.

Figure 6 is a perspective view illustrating one means by which heat and pressure may be progressively applied to different sections of the composite strip as intermittently fed therethrough step-by-step.

Figure 7 is a perspective view illustrating means by which the composite strip may be progressively and continuously treated to heat and pressure to unite the two strips together.

Figure 8 is an edge view illustrating the composite strip as wound into a spiral coil such as those commonly used for thermostatic purposes.

Composite metal strips of this character for thermostatic purposes have heretofore been produced by welding or otherwise uniting together relatively thick bars or sheets of expandible and relatively non-expandible metals, which thick bars or metals were employed owing to the fact that no furnaces were available which were adequate to receive and suitably heat and weld under pressure large surfaces or strips of sufficient length to be utilized for thermostatic coils, and consequently it was found necessary to provide and treat stock of sufficient thickness which when subsequently rolled down would produce a strip of the required length for thermostatic coils, and the difficulty experienced in rolling such thick bars was, first, that the rolling operations would cause an uneven expansion and extension between the two metals of different degrees of hardness to such an extent that they would pull one upon the other sufficiently to strain the joint or surface where they were united so that they would separate, and further it was found that by a continued rolling of these thick metals that the same would become so hardened as to require repeated annealing, which annealing operations further weakened the joint rendering the different metals easily pulled apart which in many cases would separate during the rolling operations and in other instances this weakness would develop after the coil had been wound and put into actual use.

This weakening of the joint by excessive rolling is entirely overcome by my improved method of producing the composite metal plate or strip which is by first rolling each of the strips to approximately its finished thickness and subsequently subjecting the two with the soldering strip between to a welding or uniting operation, in some instances by a progressive heating and pressing action on different adjacent portions of the strips as it is fed through a furnace of my improved construction, one form of which is described in my co-pending patent application of even date; and the following is a detailed description of my present method of producing a composite metal whereby these advantageous results may be obtained.

In the production of my improved composite metal which is primarily employed for thermostatic purposes, I employ a strip or sheet 10 of brass or copper composition as the expandible metal member of the composite strip. This strip is formed of a certain composition which is fusible at a predetermined temperature and has a relatively large co-efficient of expansion, and this I roll to approximately its finished thickness, I then provide a sheet or strip 12 of so-called invar steel which is relatively non expandible, which sheet or strip possesses properties causing it to melt at a temperature considerably higher than that of the expandible metal, and this I roll to approximately its finished thickness. I next provide a strip or sheet of so-called soldering metal 11 which is a brass or copper composition having a melting point a little lower than that of the brass or expandible strip. This soldering metal is then rolled into a thin strip or ribbon preferably to a thickness considerably less than that of either the expandible or non-expandible strips and the three strips are then assembled one upon the other with the soldering strip between the brass and the invar steel and the whole temporarily bound together at intervals along its length by any suitable readily destructible material such as for instance a string or binding cord. The assembly is then fed through a furnace, that is in one side and out the other, where it is subjected to sufficient heat to consume the binding cord and to fuse the solder strip but not sufficient to fuse either of the other strips at the same time, sufficient pressure is also applied to the strips to force them closely together to cause them to firmly unite when the solder fuses. It will be noted that this solder is of a character which melts at a temperature just a little less than that of the brass or expandible strip so that after the solder is fused and the whole is fed past the heating point in the furnace the solder will set or harden just before the expandible strip is cooled sufficiently to be strong enough to pull away from the invar steel thereby causing the two strips upon becoming cooled to be firmly welded or united together.

After the composite strip has been so formed it is then passed through a set of finishing rollers or otherwise pressed to reduce the same slightly to the finished size and also to harden it to the desired temper thus obviating the necessity of further subjecting the composite strip to an annealing temperature and also it is understood that the subsequent rolling is so slight as not to pull the metals apart by an excessive uneven stretching operation and, therefore, the maximum strength at the weld is maintained.

In some instances a welding furnace, mechanism or device such as that illustrated in Figure 6, may be employed through which the strips 10, 11 and 12 may be simultaneously fed by a progressive step-by-step movement between heated pressure blocks 13 and 14 which are heated by means of gas flames 15, pressure being applied through a manually operable handle bar 16 and the finished welded or united continuous strip 17 of composite metal is produced.

In other instances, instead of employing blocks 13 and 14 to act by a step-by-step operation upon the different sections of the composite strip, I may employ a set of heated pressure rolls 18, as illustrated in Figure 7, whereby welding may be effected by a continuous operation, if desired.

After the composite strip has been treated by rolling or otherwise to be reduced to exactly the desired thickness, I may wind the strip into a spiral coil such as illustrated in Figure 8, to be used for thermostatic purposes.

By the use in the claims of the term "approximately finished thickness," I mean that each strip is rolled or reduced to a thickness which when assembled and fused together with the other strip to form a composite strip, but little further reduction in thickness is necessary in order to reduce it to its finished or operative thickness and by "little further reduction" I mean that I do not have to reduce the same to the extent that a subsequent annealing operation is necessary.

Having thus described one illustrative embodiment of my invention and the best mode known to me for carrying out my method,

I desire it to be understood that although specific terms are employed, they are used in a generic and descriptive sense and not for the purpose of limitation, the scope of the invention being defined and limited only by the terms of the appended claims.

I claim:

1. A method for producing composite metal for thermostatic use, comprising assembling a plate of expandible metal and a plate of relatively non-expandible metal with a thin leaf therebetween of a metal fusible at a lower temperature than either of said plates, progressively feeding the assembly section by section through a welding zone, exerting pressure on the one section of the assembled metals within the welding zone while at the same time transmitting welding heat to both the upper and lower plates of the pressed portions, the pressed portions being fed out of the welding zone after melting of the intermediate leaf thereof and another section positioned in the welding zone.

2. A method for producing a composite metal for thermostatic use, comprising assembling a plate of brass and a plate of invar steel with a thin leaf therebetween of brass fusible at a lower temperature than either of said plates, progressively feeding the assembly section by section through a welding zone, exerting pressure on the one section of the assembled metals within the welding zone while at the same time transmitting welding heat to both the upper and lower plates of the pressed portions, the pressed portions being fed out of the welding zone after melting of the intermediate leaf thereof and another section positioned in the welding zone.

3. A method for producing a composite metal for thermostatic use, comprising assembling a plate of expandible metal and a plate of relatively non-expandible metal with a thin leaf therebetween of a metal fusible at a lower temperature than either of said plates, exerting pressure on one section of the assembled metals while at the same time transmitting welding heat to both the upper and lower plates of the pressed section, and progressively feeding the assembled metals section by section to similarly exert pressure and transmit welding heat to the contiguous section upon melting of the intermediate leaf of the pressed portion.

4. A method for producing a composite metal for thermostatic use, comprising assembling a plate of brass and a plate of invar steel with a thin leaf therebetween of brass fusible at a lower temperature than either of said plates, exerting pressure on one section of the assembled metals while at the same time transmitting welding heat to both the upper and lower plates of the pressed section, and progressively feeding the assembled metals section by section to similarly exert pressure and transmit welding heat to the contiguous section upon melting of the intermediate leaf of the pressed portion.

In testimony whereof I affix my signature.

FREDERICK C. LEONARD.